Sept. 25, 1951  J. HINERMAN  2,569,057
FISHING LURE
Filed June 7, 1949
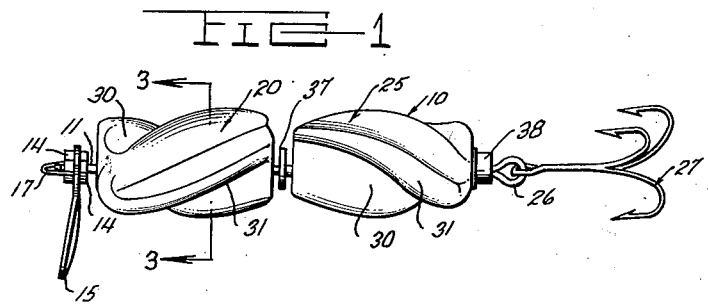
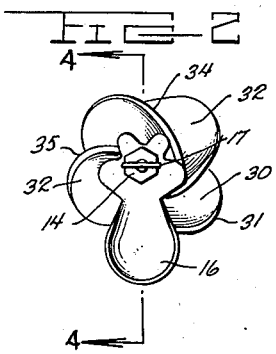
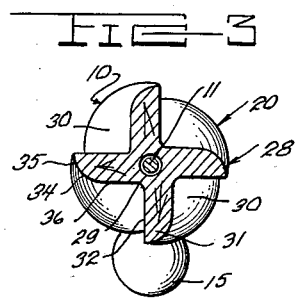
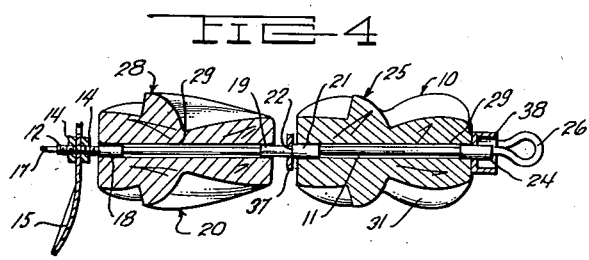
INVENTOR.
JACK HINERMAN
BY
McMorrow, Berman & Davidson
ATTORNEYS Patented Sept. 25, 1951

2,569,057

UNITED STATES PATENT OFFICE 2,569,057

FISHING LURE

Jack Hinerman, Amarillo, Tex.

Application June 7, 1949, Serial No. 97,623

2 Claims. (Cl. 43—42.2)

1

This invention relates to a fishing lure, and more particularly to a novel fishing lure having oppositely-rotating colored attracting members and a keel-like member for holding the hook and supporting shaft against rotation while the device is being drawn through the water.

It is an object of this invention to provide a fishing lure of the kind to be more particularly described hereinafter for attracting fish by the agitation of the water by the oppositely-rotating, brightly-colored, helically-grooved skirts or spools.

Another object of this invention is to provide a fishing lure of this kind which is light in weight and easy to manufacture, and as the rotating members depend solely upon their movements through the water, the independent operation about the common supporting shaft provides an efficient device, the proper operation of which is not easily obstructed by outside articles encountered by the device.

Another object of this invention is to provide a fishing lure which is substantial in structure and formation to withstand considerable use and abuse in handling by the fisherman and others who are using and carrying the device.

With the above and other objects in view, my invention consists in the arrangement, combination and details of construction disclosed in the drawings and specification, and then more particularly pointed out in the appended claims.

In the drawings:

Figure 1 is a side elevation of the fishing lure constructed according to an embodiment of my invention;

Figure 2 is a front elevation thereof;

Figure 3 is a transverse section taken on the line 3—3 of Figure 1;

Figure 4 is a longitudinal section taken on the line 4—4 of Figure 2.

Referring to the drawings, the numeral 10 designates generally a novel fishing lure constructed according to an embodiment of this invention. The fishing lure 10 is formed with a pair of rotating lure members which are rotatable in opposite directions as the fishing lure 10 is drawn through the water when attached to a suitable fishing line or the like. The rotating members of the fishing lure 10 are adapted to be colored in various bright colors for attracting the fish and the rotation of the lure elements or members of the fishing lure 10 will suitably agitate the water to attract the attention of the fish.

The fishing lure 10 is formed with a longitudinal, elongated shaft 11 having a front end portion 12 threaded for receiving a pair of nut elements 14. A keel or keel member 15 is fixed on the front, threaded end of the shaft 11, being clamped between the nuts 14 and depending from the front end of the shaft. The keel member 15 is formed substantially as a flat plate which is outwardly dished on the front side of the lower end thereof to provide a deflecting spoon member or plate with a concave front surface 16 the upper end of the member being transversely fixed on the shaft and having peripheral recesses 40 formed therein to define a plurality of fixed vanes 41, which radiate outwardly in transverse advancement of the lure members. A bail 17 is fixed on the forwardmost of the nuts 14 and extends forwardly beyond the extreme forward end of the shaft 11 to provide for the attachment of a fishing line or the like.

A collar 18 is fixed to or formed integrally with the shaft 17, adjacent the forward end thereof, and a similar collar 19 is formed on the shaft 11 intermediate the length thereof or at the center. The collars 18 and 19 are cylindrical in configuration, having similar outside diameters and provide bearing members for the forwardmost of the rotating lure members 20. A collar 21 is fixed to or formed integrally with the intermediate collar 19 and is formed with an outside diameter slightly greater than the outside diameter of the collar 19 defining a shoulder 22 therebetween. A rear bearing member or collar 24 is fixed on the extreme rear end of the shaft 11, the rearmost collars 21 and 24 providing the journals or bearing members for the rearmost lure member 25. A suitable hook or eye 26 is formed from the extreme rear end of the shaft 11 rearwardly of the rear collar or bearing 24 and provides an attaching eye for swingably securing a fish hook 27 to the rear end of the shaft 11 and to the rear end of the fishing lure 10. Preferably, a treble or triple type of hook 27 is used with the fishing lure 10, as most clearly shown in Figure 1 of the drawings.

The fishing lure 10 is formed with a pair of rotatable lure members 20 and 25 which are rotatably supported on the shaft 11. Each of the lure members 20 and 25 is formed of a block of wood, plastic or other suitable material which is formed to the desired shape to be more particularly described hereinafter.

The rotatable fishing lure member 20 is formed of a substantially cylindrical body or block 28 having a longitudinally-extending bore 29 through the center thereof. The bore 29 has an inside diameter slightly greater than the outside diameter of the bearing members or collars 18 and 19, whereby the body 28 will be freely and rotatably supported on the forward end of the shaft 11. The body 28 is formed on the outer side thereof with a plurality of longitudinally-extending grooves 30 which are helically arranged along the length of the body for defining a plurality of circumferentially-spaced-apart vanes 31. Each of the vanes or blades 31 is formed with a flat rear side 32 and a cambered front side 34, as most clearly shown in Figure 3 of the drawings. The camber of the rear surface 34 is defined by a segmental arcuate nose section 35 which joins the innermost rear surface 36 intermediate the length of the blades 31, the rear portion 36 of the upper surface being substantially parallel to the flat, substantially radial, lower surface 32 of the blades. The grooves 30 between the adjacent blades 31 provide for the rotation of the rotatable lure member 20 as the fishing lure 10 is drawn through the water.

The rearmost rotating lure member 25 is rotatably supported on the enlarged bearing or collars 21 and 24 and is formed in substantially the same manner as the rotatable lure member 20 described above, the longitudinally-extending blades 31 of the rear lure member 25 having a pitch opposed to the pitch of the forward lure member 20, whereby the rear lure member 25 is caused to rotate in a direction opposite from the direction of rotation of the forwardmost lure member 20. A washer 37 is carried by the shaft 11 intermediate the length thereof for separating the rotatable lure members 20 and 25 and the inside diameter of the washer opening is slightly greater than the outside diameter of the collar 19 and smaller than the outside diameter of the adjacent collar 21, whereby the washer 37 is adapted to be seated or rested on the shoulder 22 and thereby restrained against movement rearwardly on the shaft 11. The washer 37 being restrained against rearward movement on the shaft 11, and being engageable with the rear end of the forwardmost lure member 20 will restrain the forward lure member 20 against sliding movement rearwardly on the shaft 11 and hold the forwardmost lure member out of engagement with the rearwardmost lure member 25. A cylindrical member 38 is engaged about the rearmost collar 24 between the rear end of the rearmost lure member 25 and the attaching eye 26 at the rear end of the shaft 11 for holding the rear lure member 25 against excessive rearward sliding movement on the shaft 11. The sleeve 38 will abut against the forward side of the eye 26 upon limited sliding movement rearwardly on the shaft 11 and thereby restrain excessive rearward sliding movement of the rear lure member 25.

In order to provide for an attractive fishing lure of the kind described above, it is anticipated that the lure members 20 and 25 will be gaily colored with various arrangements of colors, and preferably, each of the grooves 30 of each of the lure members 20 and 25 will have a different color, whereby, upon rotation of the lure members 20 and 25, the various colored rotating members will provide a bright attraction for the fish to be lured to the device 10.

In the use and operation of the fishing lure 10, for assembling the lure 10, the sleeve 38 is initially slid downwardly on the shaft 11 from the front to the rear end. The rear rotating lure 25 is then engaged on the shaft by extending the forward end of the shaft 11 through the central bore 29 and the lure member 25 will be rotatably supported on the collars or bearing members 20 and 24. The washer 37 is then engaged about the forward end of the shaft 11 and will be seated on the abutment member or shoulder 22. After this, the forwardmost rotating member 20 will be engaged on the bearing members 18 and 19 forwardly of the washer 37 and then the keel 15 will be secured on the forward threaded end of the shaft, as clearly noted in Figure 4 of the drawings. One of the washers 14 will be disposed on the rear side of the keel member 15 and the other washer 14 will be engaged on the forward side thereof for securely locking the keel member 15 in its selected position on the forward end of the shaft 11.

As the lure 10 is drawn through the water, the depending lure 15 being concave on the forward side thereof, will cause the lure 10 to partially dive in the water and will hold the shaft 11 and hook 27 against rotation relative to the fishing line, not shown in the drawings. As the shaft 11 and fishing lure 10 are drawn through the water, the forwardmost lure member 20 will be caused to rotate in one direction, clockwise, as viewed in Figure 1 of the drawings, and the rearmost lure member 25 will be caused to rotate in the other, counterclockwise direction. While the lure members 20 and 25 are rotating in their respective opposite directions, the shaft 11 will remain substantially stationary as the keel member 15 is positioned on the forward end of the shaft 11 to remain in a substantially vertical depending relation to the shaft and drawing of the lure 10 through the water will not cause the keel 15 to rotate about the axis of the shaft in the manner of the rotatable lure members 20 and 25.

I do not mean to confine myself to the exact details of construction herein disclosed, but claim all variations falling within the purview of the appended claims.

I claim:

1. A fishing lure comprising a straight shaft, bearing means circumposed on the shaft, lure members rotatably disposed in axial alignment on the shaft and having their adjoining ends spaced by the bearing means, said members having longitudinally extending helically arranged blades projecting therefrom, the blades of one lure member with the blades of the other lure member effecting a rotation of the members in opposite directions upon moving the shaft through the water, means for attaching a line to one end of the shaft, hook means connected to the other end of the shaft, a plate depending from the shaft adjacent to the line attaching means and disposed in advance of the lure members for retaining said shaft against rotation, said plate having a spoon shaped lower end and a flat enlarged attaching end circumposed on the shaft, said last end having circumferentially spaced peripheral recesses defining fixed vanes radiating outwardly transversely in advance of the lure members.

2. In a fishing lure including a shaft having axially aligned lure members journaled thereon for rotation in opposite directions, the improvement which comprises a plate adapted to depend at right angles from the shaft and disposed in advance of the lure members for retaining the shaft against rotation, said plate having a spoon shaped lower end defining a concave forward striking face and a convex rearward face and having an enlarged attaching end adapted to be transversely fixed on the shaft, said last end having peripheral recesses defining spaced vanes adapted to radiate outwardly transversely in advance of the lure members.

JACK HINERMAN.

REFERENCES CITED

The following references are of record in the file of this patent:

UNITED STATES PATENTS

| Number | Name | Date |
|---|---|---|
| 667,257 | Shakespeare et al. | Feb. 5, 1901 |
| 830,404 | Barnes et al. | Sept. 4, 1906 |
| 1,140,279 | Myers | May 18, 1915 |
| 1,474,823 | Hines | Nov. 20, 1923 |
| 1,931,932 | Myers et al. | Oct. 24, 1933 |
| 2,043,001 | Lambrecht | June 2, 1936 |
| 2,435,993 | Zink | Feb. 17, 1948 |